United States Patent
Eccles et al.

(10) Patent No.: US 8,171,339 B2
(45) Date of Patent: May 1, 2012

(54) TESTING A VIRTUALISED STORAGE SYSTEM IN RESPONSE TO DISK EXERCISING COMMANDS

(75) Inventors: Peter Eccles, Winchester (GB); Cameron James Mcallister, Eastleigh (GB); Hedley Proctor, Southhampton (GB)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 12/474,975

(22) Filed: May 29, 2009

(65) Prior Publication Data

US 2009/0300426 A1 Dec. 3, 2009

(30) Foreign Application Priority Data

Jun. 2, 2008 (EP) .................................. 08157436

(51) Int. Cl.
*G06F 11/00* (2006.01)

(52) U.S. Cl. ........................................................ 714/26

(58) Field of Classification Search .................... 714/42, 714/26, 27
See application file for complete search history.

(56) References Cited

U.S. PATENT DOCUMENTS

| | | | |
|---|---|---|---|
| 7,032,136 B1 * | 4/2006 | Gajjar et al. | 714/43 |
| 2004/0225926 A1 * | 11/2004 | Scales et al. | 714/43 |

* cited by examiner

*Primary Examiner* — Scott Baderman
*Assistant Examiner* — Yair Leibovich
(74) *Attorney, Agent, or Firm* — Rabindranath Dutta Konrad Raynes and Victor LLP

(57) ABSTRACT

Provided are a method, apparatus, and computer program product for testing a virtualized storage system. Data defining one or more configuration features of the virtualized storage system is received. Also received is a set of one or more predetermined rules defining interpretation of the disk exercising commands, the interpretation being dependent on one or more of the configuration features. A first disk exercising command is received. The first disk exercising command is interpreted in accordance with one of the predetermined rules to produce a second disk exercising command. The second disk exercising command is sent to the virtualized storage system.

17 Claims, 5 Drawing Sheets

| VSTD Mapping Table | |
|---|---|
| Modified Virtual Disk Address | Original Virtual Disk Address |
| LUN 2, LBA 1 | LUN 1, LBA 1 |
| LUN 2, LBA 2 | LUN 1, LBA 4 |
| LUN 2, LBA 3 | LUN 1, LBA 8 |
| LUN 2, LBA 4 | LUN 1, LBA 12 |
| LUN 2, LBA 5 | LUN 1, LBA 16 |
| LUN 2, LBA 6 | LUN 1, LBA 20 |
| LUN 2, LBA 7 | LUN 1, LBA 24 |
| LUN 2, LBA 8 | LUN 1, LBA 28 |
| LUN 2, LBA 9 | LUN 1, LBA 32 |

Figure 4

TESTING A VIRTUALISED STORAGE SYSTEM IN RESPONSE TO DISK EXERCISING COMMANDS

CROSS-REFERENCE TO RELATED FOREIGN APPLICATION

This application is a non-provisional application that claims priority benefits under Title 35, Unites States Code, Section 119(a)-(d) from EP Patent Application entitled "A Method, Apparatus and Software for Testing a Virtualised Storage System in Response to Disk Exercising Commands" by Proctor Hedley, Peter Eccles and James McAllister Cameron, having EP patent application Ser. No. 08157436.0, filed on Jun. 2, 2008, which application is incorporated herein by reference in its entirety.

BACKGROUND

1. Field

The disclosure relates to a method, apparatus, and computer program product for testing a virtualised storage system in response to disk exercising commands.

2. Background

Virtualised storage systems are commonly used in computer systems and are provided by a virtualisation management system. The virtualisation management system is arranged to present a set of physical storage resources as a single logical storage resource or disk. Different types of physical storage elements may make up a virtualised storage system and may be distributed over a network.

Once a virtualisation management system has created a virtual disk, file system benchmarking or disk exercising software tools may be used to test the virtual disk before it is made available for use. Such systems are used to perform selected sets of tests on the virtual disk to determine whether its performance and data consistency are within predetermined limits. A common test for virtual disks is to perform Input/Output (I/O) requests to each element of the virtual disk to test whether all elements are available and functioning acceptably. However, a problem arises when the size of the virtual disk or disks is larger than the amount of physical storage available to the virtualised storage system because disk exercising software tools are written to perform I/O requests to the whole of the virtual disk. A further problem arises when the virtual disk is large because performing such I/O request for the virtual disk consumes large amounts of processing resource over a significant time.

SUMMARY OF THE PREFERRED EMBODIMENTS

Certain embodiments provide a method for testing a virtualised storage system in response to disk exercising commands, the method comprising:
receiving data defining one or more configuration features of a virtualised storage system;
receiving a set of one or more rules defining interpretation of disk exercising commands, the interpretation being dependent on one or more of the configuration features;
receiving a first disk exercising command;
interpreting the disk exercising command in accordance with one of the predetermined rules to produce a second disk exercising command; and
sending the second disk exercising command to the virtualised storage system.

The method may comprise presenting a first address space for use by a disk exercising system, the first address space comprising a set of addresses selected from the virtualised storage system address space and presented for use by the disk exercising system as a single contiguous address space. The first address space may be selected from the virtualised storage system address space in accordance with the predetermined rule and in dependence on the configuration feature. A mapping may be maintained between the first address space and the virtualised storage system address space for use in the interpreting of the disk exercising command.

Any response to the second disk exercising command received from the virtualised storage system may be transparently returned to its source disk exercising system. Each configuration feature may be a storage element that comprises the virtualised storage system and one or more of the predetermined rules define the selection of at least one address for each storage element for the first address space. One or more of the configuration features may be a feature of the virtualisation configuration of the virtualised storage system. At least one of the configuration features may be a grain. One or more of the configuration features may be a feature of the physical storage configuration of the virtualised storage system.

Another embodiment provides an apparatus for testing a virtualised storage system in response to disk exercising commands, the apparatus being operable to:
receive data defining one or more configuration features of a virtualised storage system;
receive a set of one or more rules defining interpretation of disk exercising commands, the interpretation being dependent on one or more of the configuration features;
receive a first disk exercising command;
interpret the disk exercising command in accordance with one of the predetermined rules to produce a second disk exercising command; and
send the second disk exercising command to the virtualised storage system.

A further embodiment provides a group of one or more programs arranged to enable a group of one or more programmable devices to perform a method for testing a virtualised storage system in response to disk exercising commands, the method comprising:
receiving data defining one or more configuration features of a virtualised storage system;
receiving a set of one or more rules defining interpretation of disk exercising commands, the interpretation being dependent on one or more of the configuration features;
receiving a first disk exercising command;
interpreting the disk exercising command in accordance with one of the predetermined rules to produce a second disk exercising command; and
sending the second disk exercising command to the virtualised storage system.

Another embodiment provides a group of one or more programs arranged to enable a group of one or more programmable devices to provide apparatus for testing a virtualised storage system in response to disk exercising commands, the apparatus being operable to:
receive data defining one or more configuration features of a virtualised storage system;
receive a set of one or more rules defining interpretation of disk exercising commands, the interpretation being dependent on one or more of the configuration features;
receive a first disk exercising command;

interpret the disk exercising command in accordance with one of the predetermined rules to produce a second disk exercising command; and send the second disk exercising command to the virtualised storage system.

BRIEF DESCRIPTION OF THE DRAWINGS

Embodiments will now be described, by way of example only, with reference to the accompanying drawings in which:

FIG. 4 is a table illustrating address mappings used by the VSTD application program of FIG. 2.

DETAILED DESCRIPTION

Figure 1:
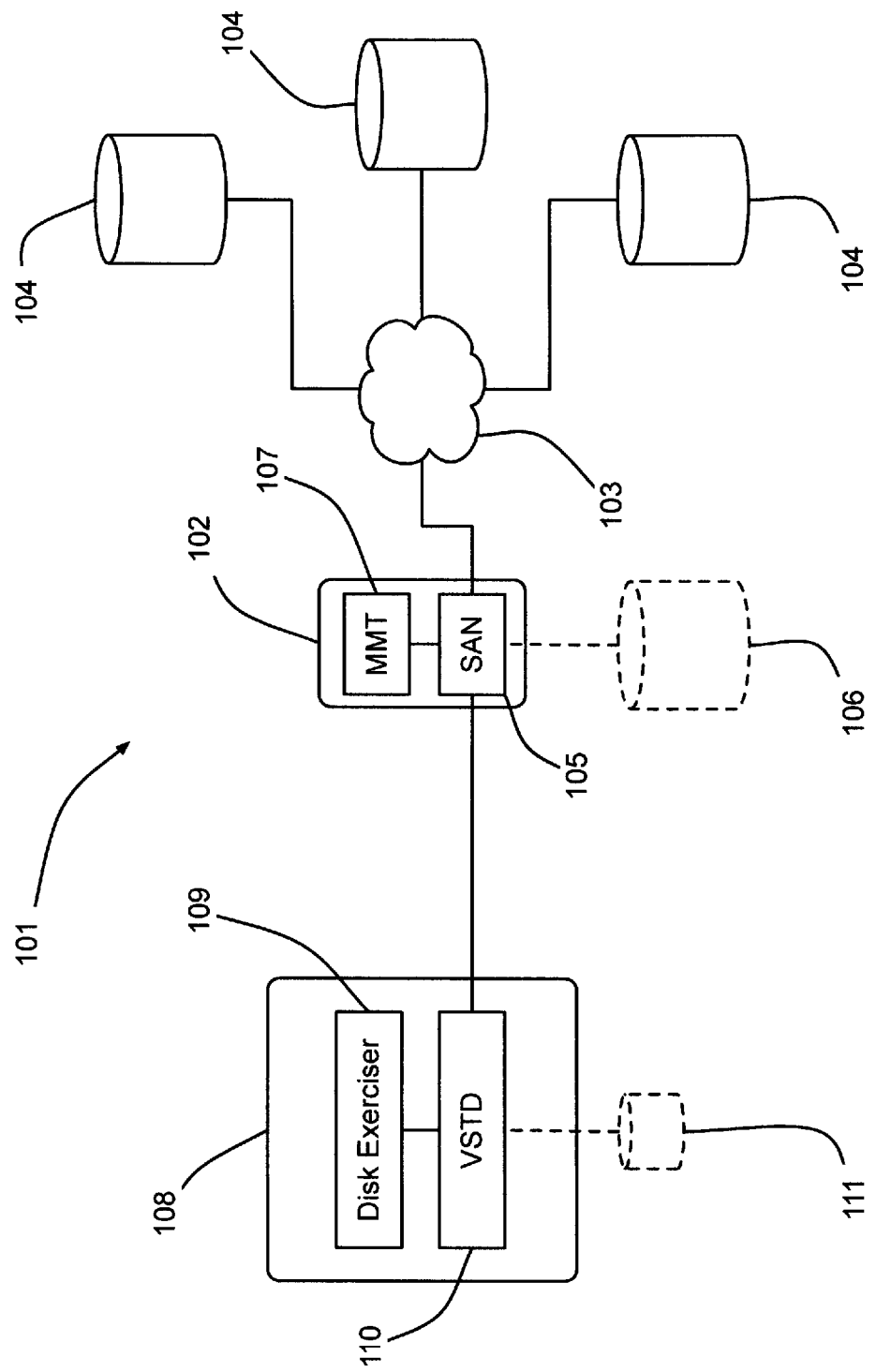
FIG. 1 is a schematic illustration of a computer system providing a testing system for a virtualised storage system.

With reference to FIG. 1, a computer system 101 comprises a first computer 102 connected via a network 103 to a set of physical storage devices 104 in the form of physical disk drives. The first computer 102 is running a storage virtualisation application program 105 in the form of a storage area network (SAN) controller. The SAN controller 105 is arranged to create a logical or virtual disk 106 from the physical storage disks 104 and creates mapping data 107, in the form of a Meta-data Mapping Table (MMT) that maps the addresses for the virtual disk 106 to the appropriate physical storage addresses on the physical disks 104. The SAN controller 105 is connected to a second computer 108 running a disk exercising application program 109 arranged to test the performance and data consistency of the virtual disk 106 against a set of predetermined measures before the virtual disk 106 is made available for use.

In certain embodiments, a virtual storage test driver (VSTD) program 110 is connected between the disk exercising application program 109 and the SAN controller 105. The VSTD 110 is arranged to present the storage provided by the virtual disk 106 to the disk exerciser 109 in a modified form so as to enable standard disk exercising commands to be used to exercise selected portions of the virtual disk 106. In other words, the VSTD selects a predetermined set of addresses from the address space for the virtual disk 106 and presents them to the disk exerciser as a single contiguous address space represented in FIG. 1 as a modified virtual disk 111. The VSTD is then arranged to intercept disk exercising commands from the disk exerciser 109 and to interpret the address from the compacted address space for the modified virtual disk 111 into the address space for the original virtual disk 106. Any responses from the SAN controller 105 received by the VSTD 110 are passed back transparently, that is without interpretation, to the disk exerciser 109. In other words, the operation of the VSTD 110 is arranged to be transparent to both the disk exerciser 109 and the SAN controller 105.

Figure 2:
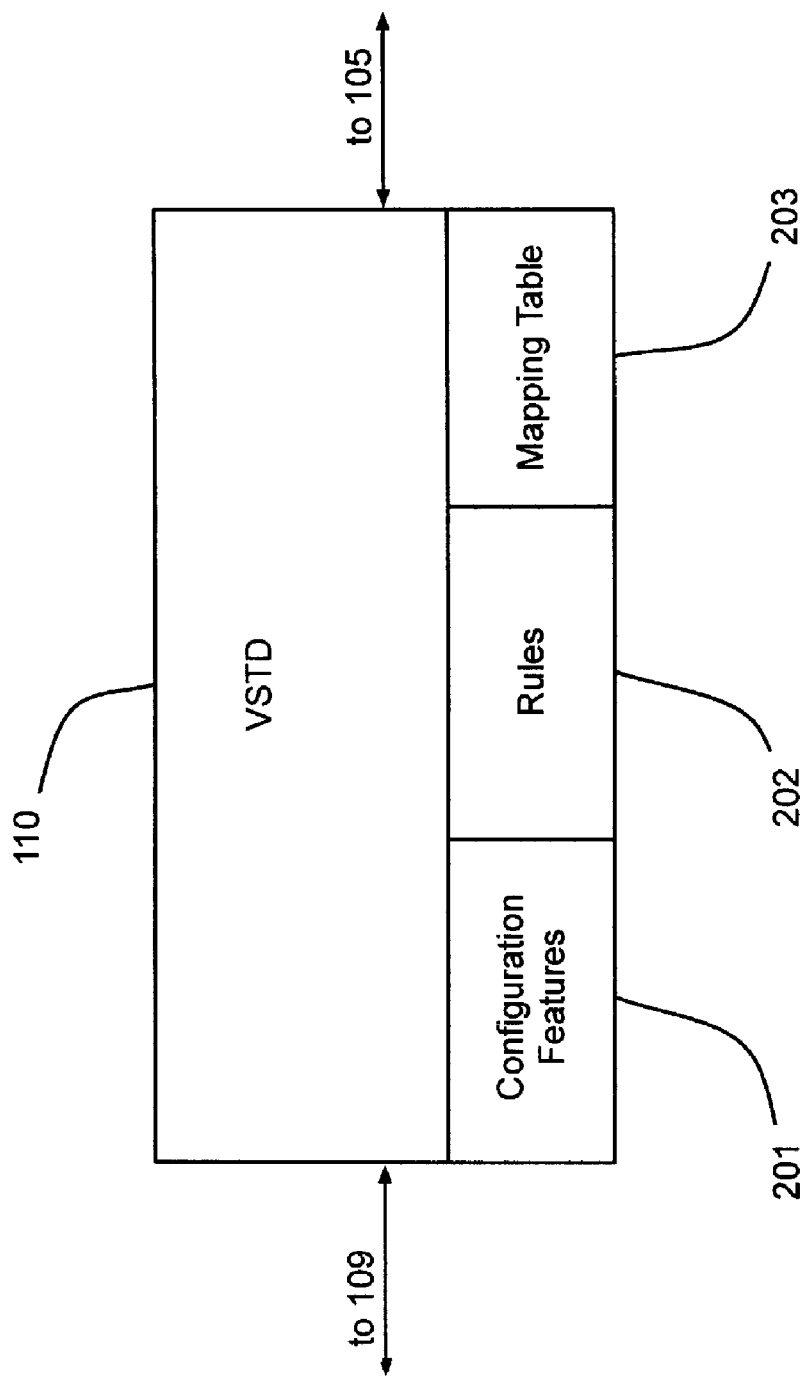
FIG. 2 is a schematic illustration of a virtual storage test driver (VSTD) application program in the testing system of FIG. 1.

With reference to FIG. 2, the VSTD 110 comprises a set of one or more configuration features 201, a set of one or more rules 202 and a VSTD mapping table 203. The set of configuration features 201 and the rules 202 are used by the VSTD 110 to create the VSTD mapping table 203. The configuration features 201 comprise features of the virtualisation configuration or of the physical configuration of the virtual disk 106 such as the specification for a storage element. Each of the rules defines a schema for testing the virtual disk 106, with each schema being dependent on one or more of the configuration features.

Figure 3:
FIG. 3 is a table illustrating policies used by the VSTD application program of FIG. 2.

FIG. 3 shows and example of a set of rules 202 for use in certain embodiments. The set of rules 202 are each dependent on a configuration feature 201 in the form of a storage element. In certain embodiments, the storage element feature is the granularity or grain size for the mapping between the virtual disk 106 and the physical disks 104 that is set in the SAN controller 105. The first of the rules 202 is arranged to ensure that every grain of the virtual disk 106 is exercised and in response to the selection of this rule, the VSTD 110 creates the mapping table 203 that maps between the address space of the modified virtual disk 111 and the address space of the original virtual disk 106. For example, given an original virtual disk 106 having a grain size of 32 kilobytes, the VSTD 110 is arranged to create a mapping table 203 that maps each byte of the compacted address space to separate grain in the original address space. Thus, in response to a disk exerciser command to write to the whole of the modified virtual disk 111, the first byte is written to the start of the original virtual disk 106, the second byte is written at 32 kilobytes to the second grain, the third byte is written at 64 kilobytes to the third grain and so on. Once the whole of the modified virtual disk 111 has been written to each grain of the original virtual disk 106 has been exercised.

FIG. 4 shows an example of the contents of the mapping table 203 created by the VSTD 110 in response to the selection of the first rule 202. The original virtual disk 106 and the modified virtual disk 111 are identified within the computer system 101 by respective Logical Unit Numbers (LUNs) and their respective address spaces are indexed or addressed using Logical Block Addresses (LBAs). Thus, continuing the example above, with a 32 kilobyte grain size and having LBAs at 8 kilobyte intervals, every fourth LBA from the address space for the original virtual disk 106 is mapped to consecutive LBAs in the address space for the modified virtual disk 111 as shown in FIG. 4. Thus the LBAs for the start of each grain in the original virtual disk 106 are presented to the disk exerciser 109 as the single contiguous address space for the modified virtual disk 111. As a result, a disk exercising commands to read or write to the whole of the modified virtual disk 111 will result in every grain within the original virtual disk 106 being exercised.

Returning to FIG. 3, two further rules 202 are provided. The second rule enables an evenly distributed subset of all grains to be exercised, with the interval between exercised grains being selectable on setup of the rule. The third rule enables a randomly selected subset of all grains to be exercised, with the number or proportion of grains being selectable on setup of the rule.

Figure 5:
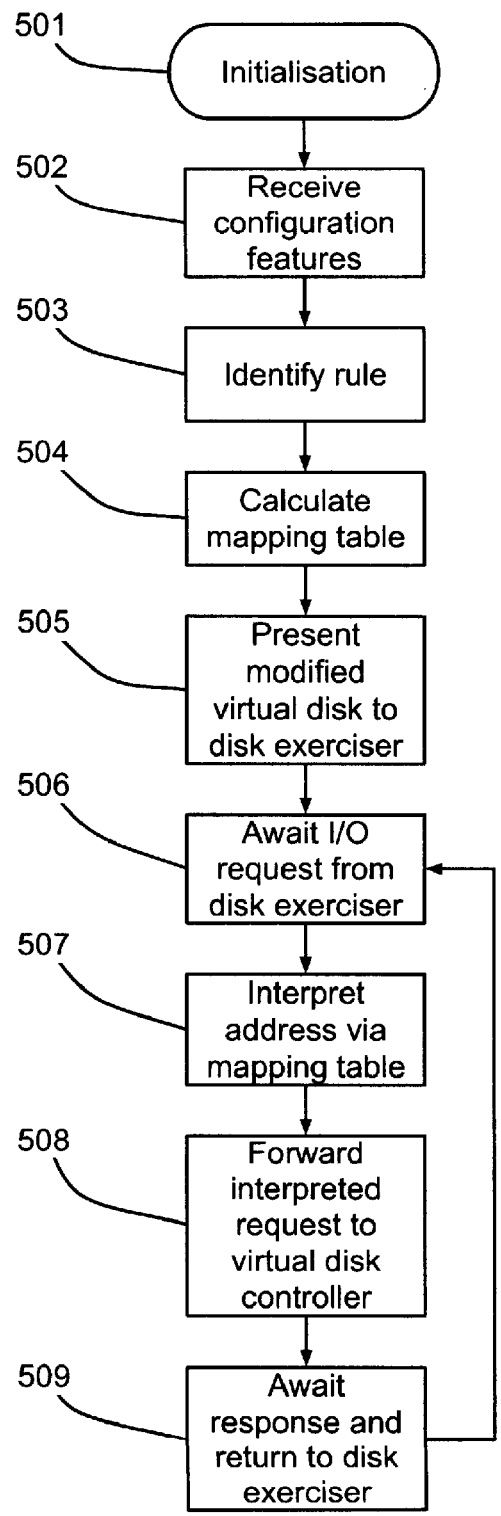
FIG. 5 is a flow chart illustrating processing performed in the VSTD application program of FIG. 2.

The processing performed by the VSTD 110 will now be described further with reference to the flow chart of FIG. 5. At step 501, the processing of the VSTD 110 is initiated and processing moves to step 502. At step 502, the configuration features 201 of the virtual disk 106 are provided and processing moves to step 503. At step 503, the relevant rule is identified from the set of rules 202 and processing moves to step 504. At step 504, the VSTD mapping table 203 is calculated using the selected rule 202 taking into account the supplied configuration feature 201 and processing moves to step 505 where the modified virtual disk 111 is presented to the disk exerciser 109 and processing moves to step 506. At step 506, processing awaits the receipt of an I/O request from the disk exerciser 109 and once such a request is received processing moves to step 507. At step 507, the address in the received request is translated from the address space for the modified virtual disk 111 to the address space of the original virtual disk 106 using the address mappings in the VSTD mapping table 203 created in step 504 above. Processing then moves to step 508 where the interpreted I/O request is passed to the SAN controller 105 and processing moves to step 509. At step 509 processing awaits any expected response from the SAN controller 105 and once received passes the response transparently back to the disk exerciser 109 and processing returns to step 506 and continues as described above. If however, no response is expected from the SAN controller 105 then processing moves immediately to step 506.

Thus certain embodiments enable large virtual storage systems to be tested more efficiently by reducing the time it would otherwise take to perform I/O request on a whole volume. Furthermore, a number of different testing patterns or schemas may be selectively provided. Thus the pattern of I/O requests generated by the disk exerciser can be modified so as to perform specific tests suited to a particular virtual storage system. Generic or publicly available disk exercisers may therefore be used to test specific or proprietary storage virtualization arrangements, with the VSTD functionality providing an interface between the two systems.

As will be understood by those skilled in the art, the functions of the VSTD described above may be implemented at any suitable location within a virtual storage testing system. For example, instead of the VSTD functions being implemented in host software as a device driver, it may also be implemented within a file system or provided by an application library linked to the I/O exerciser. The functions of the VSTD may also be provided embedded within an implementation of a disk or I/O exerciser or as a test library embedded within a storage appliance or storage controller.

Space Efficient (SE) virtual disk are a specialized form of virtual storage in which the virtual disk that is presented to the host machine is larger than the physical storage currently allocated for it by the SAN controller. As an SE virtual disk fills up, the physical storage allocated to it is increased, either automatically by the SAN controller, or manually by a storage administrator. Such SE virtual disks are therefore difficult to properly test. The functionality of the VSTD described above enables rules to be provided that ensure that at least a proportion of the whole offered size of such an SE virtual disk is actually tested.

Certain embodiments provide an extensible set of rules or policies for testing a virtual storage system along with means to test future storage virtualization technologies without writing additional testing system code, but instead by writing new rules or policies. Other embodiments may be provided with only one rule or policy.

In certain alternative embodiments, the VSTD functionality is arranged to automatically gather a set of configuration features from the virtual storage control system. In a further embodiment, the virtual storage control system may be arranged to automatically provide configuration features to the VSTD functionality.

In certain other alternative embodiments, the configuration features used by the VSTD functionality relate to the configuration of the physical storage that provides the virtual storage along with a corresponding set of one or more rules. In other words, the configuration features are features of the physical storage configuration of the virtualised storage system. In a further embodiment, the VSTD uses both virtualization and physical configuration features along with a corresponding set of one or more rules.

It will be understood by those skilled in the art that the apparatus that embodies a part or all of the described embodiments may be a general purpose device having software arranged to provide a part or all of an embodiment. The device could be a single device or a group of devices and the software could be a single program or a set of programs. Furthermore, any or all of the software used to implement certain embodiments can be communicated via any suitable transmission or storage means so that the software can be loaded onto one or more devices.

While illustrative embodiments have been provided, and while the embodiments have been described in considerable detail, it is not the intention of the applicant to restrict or in any way limit the scope of the appended claims to such detail. Additional advantages and modifications will readily appear to those skilled in the art. Therefore, the claims in their broader aspects are not limited to the specific details of the described representative apparatus and method, and illustrative examples shown and described. Accordingly, departures may be made from such details without departure from the spirit or scope of applicant's general inventive concept.

What is claimed is:

1. A computer-implemented method for testing a virtualised storage system, the method comprising:
   receiving, by a computer, data defining one or more configuration features of the virtualised storage system;
   receiving, a set of one or more predetermined rules defining interpretation of disk exercising commands, the interpretation being dependent on one or more of the configuration features, wherein at least one of the configuration features is a grain, and wherein a selected rule enables a selected number of grains that is fewer than all grains to be exercised;
   receiving, a first disk exercising command;
   interpreting the first disk exercising command in accordance with the selected rule that enables the selected number of grains that is fewer than all grains to be exercised to produce a second disk exercising command; and
   sending the second disk exercising command to the virtualised storage system, wherein the selected rule is a first rule, and wherein a second rule enables a randomly selected subset of all grains to be exercised.

2. The computer-implemented method of claim 1, the computer-implemented method further comprising:
   presenting a first address space for use by a disk exercising system, the first address space comprising a set of addresses selected from a virtualised storage system address space and presented for use by the disk exercising system as a single contiguous address space.

3. The computer-implemented method of claim 2, wherein the first address space is selected from the virtualised storage system address space in accordance with the predetermined rules and in dependence on the configuration features.

4. The computer-implemented method of claim 2, wherein a mapping is maintained between the first address space and the virtualised storage system address space for use in the interpreting of the disk exercising command.

5. The computer-implemented method of claim 2, wherein any response to the second disk exercising command received from the virtualised storage system is transparently returned to a source disk exercising system.

6. The computer-implemented method of claim 2, wherein each configuration feature is a storage element that comprises the virtualised storage system and one or more of the predetermined rules define the selection of at least one address for each storage element for the first address space.

7. The computer-implemented method of claim 1, wherein the computer-implemented method further comprises:

presenting a first address space for use by a disk exercising system, the first address space comprising a set of addresses selected from a virtualised storage system address space and presented for use by the disk exercising system as a single contiguous address space, wherein:

the first address space is selected from the virtualised storage system address space in accordance with the predetermined rules and in dependence on the configuration features;

a mapping is maintained between the first address space and the virtualised storage system address space for use in the interpreting of the disk exercising command;

any response to the second disk exercising command received from the virtualised storage system is transparently returned to a source disk exercising system;

each configuration feature is a storage element that comprises the virtualised storage system and one or more of the predetermined rules define the selection of at least one address for each storage element for the first address space;

wherein one or more of the configuration features is a feature of the virtualisation configuration of the virtualised storage system.

8. An apparatus for testing a virtualised storage system, the apparatus comprising:

a computer system, the computer system being operable to:

receive data defining one or more configuration features of the virtualised storage system;

receive a set of one or more predetermined rules defining interpretation of disk exercising commands, the interpretation being dependent on one or more of the configuration features, wherein at least one of the configuration features is a grain, and wherein a selected rule enables a selected number of grains that is fewer than all grains to be exercised;

receive a first disk exercising command;

interpret the first disk exercising command in accordance with the selected rule that enables the selected number of grains that is fewer than all grains to be exercised to produce a second disk exercising command; and send the second disk exercising command to the virtualised storage system, wherein the selected rule is a first rule, and wherein a second rule enables a randomly selected subset of all grains to be exercised.

9. The apparatus of claim 8, the computer system being further operable to:

present a first address space for use by a disk exercising system, the first address space comprising a set of addresses selected from a virtualised storage system address space and presented for use by the disk exercising system as a single contiguous address space.

10. The apparatus of claim 9, wherein the first address space is selected from the virtualised storage system address space in accordance with the predetermined rules and in dependence on the configuration features.

11. The apparatus of claim 9, wherein a mapping is maintained between the first address space and the virtualised storage system address space for use in the interpreting of the disk exercising command.

12. The apparatus of claim 9, wherein any response to the second disk exercising command received from the virtualised storage system is transparently returned to a source disk exercising system.

13. A computer program product, wherein software code stored in the computer program product when loaded into an internal memory of a digital computer causes operations to be performed, the operations comprising:

receiving data defining one or more configuration features of a virtualised storage system;

receiving a set of one or more predetermined rules defining interpretation of disk exercising commands, the interpretation being dependent on one or more of the configuration features, wherein at least one of the configuration features is a grain, and wherein a selected rule enables a selected number of grains that is fewer than all grains to be exercised;

receiving a first disk exercising command;

interpreting the first disk exercising command in accordance with the selected rule that enables the selected number of grains that is fewer than all grains to be exercised to produce a second disk exercising command; and sending the second disk exercising command to the virtualised storage system, wherein the selected rule is a first rule, and wherein a second rule enables a randomly selected subset of all grains to be exercised.

14. The computer program product of claim 13, the operations further comprising:

presenting a first address space for use by a disk exercising system, the first address space comprising a set of addresses selected from a virtualised storage system address space and presented for use by the disk exercising system as a single contiguous address space.

15. The computer program product of claim 14, wherein the first address space is selected from the virtualised storage system address space in accordance with the predetermined rules and in dependence on the configuration features.

16. The computer program product of claim 14, wherein a mapping is maintained between the first address space and the virtualised storage system address space for use in the interpreting of the disk exercising command.

17. The computer program product of claim 14, wherein any response to the second disk exercising command received from the virtualised storage system is transparently returned to a source disk exercising system.

* * * * *